US012752770B2

(12) United States Patent
Kato

(10) Patent No.: US 12,752,770 B2
(45) Date of Patent: Oct. 6, 2026

(54) MOVING BODY CONTROL DEVICE, MOVING BODY CONTROL METHOD, AND RECORDING MEDIUM FOR HANDLING SOFTWARE ABNORMALITY

(71) Applicant: HONDA MOTOR CO., LTD., Tokyo (JP)

(72) Inventor: Hisahiro Kato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 39 days.

(21) Appl. No.: 18/937,850

(22) Filed: Nov. 5, 2024

(65) Prior Publication Data

US 2025/0153706 A1 May 15, 2025

(30) Foreign Application Priority Data

Nov. 9, 2023 (JP) ................................ 2023-191272

(51) Int. Cl.
*B60W 20/50* (2016.01)
*B60W 50/02* (2012.01)
*G06F 8/65* (2018.01)

(52) U.S. Cl.
CPC ........ *B60W 20/50* (2013.01); *B60W 50/0205* (2013.01); *B60W 50/0225* (2013.01); *G06F 8/65* (2013.01)

(58) Field of Classification Search
CPC ............. B60W 20/50; B60W 50/0205; B60W 50/0225; G06F 8/65
See application file for complete search history.

(56) References Cited

U.S. PATENT DOCUMENTS

2018/0341476 A1 11/2018 Kitao
2019/0258469 A1 8/2019 Hayashidera
2020/0110372 A1* 4/2020 Paffen ................. G06F 11/2007
2022/0171613 A1* 6/2022 Goto .......................... G06F 8/65
2022/0398089 A1 12/2022 Gunji et al.
2023/0409316 A1* 12/2023 Aiba ....................... B60R 16/02

FOREIGN PATENT DOCUMENTS

JP 2018-200510 A 12/2018
JP 2019-144669 A 8/2019
JP 2022-077803 A 5/2022
JP 7273188 B 5/2023

OTHER PUBLICATIONS

Japanese Office Action Corresponding to JP Application No. 2023-191272 dated Feb. 25, 2025, 4 pages.

* cited by examiner

*Primary Examiner* — Steven Vu Nguyen
(74) *Attorney, Agent, or Firm* — Rankin, Hill & Clark LLP

(57) ABSTRACT

A moving body control device includes: a software update unit that performs update processing of first software or second software; a software abnormality recognition unit that recognizes presence or absence of an abnormality of first software and second software after the update processing is performed; and a software abnormality handling unit that causes either a first processor or a second processor to perform abnormality handling processing of operating a target moving body to be controlled by the moving body control device in a predetermined abnormality handling mode, in a case where the software abnormality recognition unit recognizes the abnormality of either the first software stored in a first memory or the second software stored in a second memory.

7 Claims, 6 Drawing Sheets

MOVING BODY CONTROL DEVICE, MOVING BODY CONTROL METHOD, AND RECORDING MEDIUM FOR HANDLING SOFTWARE ABNORMALITY

INCORPORATION BY REFERENCE

The present application claims priority under 35 U.S.C. § 119 to Japanese Patent Application No. 2023-191272 filed on Nov. 9, 2023. The content of the application is incorporated herein by reference in its entirety.

BACKGROUND

Technical Field

The present invention relates to a moving body control device, a moving body control method, and a recording medium.

Related Art

A technique for supporting software update has been conventionally proposed in a control device to be mounted on a moving body such as a vehicle. For example, JP 2019-144669 A discloses a configuration in which an area for storing a program that is running and an area for storing an update program are set in a storage unit for storing programs to be executed by an electronic control unit (ECU) mounted on a vehicle. According to this configuration, the update program can be stored in the storage unit, also while the program is running, and restrictions on the timing of updating the program can be reduced.

SUMMARY

Software such as a program or the like for use in a moving body control device includes important software that performs basic operations of the moving body. Hence, if the software is not normally updated, the operation of the moving body may be troubled. For example, in updating a plurality of pieces of software to be individually performed by a plurality of processors, when a software update for any of the processors is not normally completed, or an abnormality occurs in updated software, the processors are not capable of synchronizing each other in accordance with a new version of the software, and the moving body becomes inoperable. For this reason, it is an object of the present application to suppress a situation in which the moving body becomes inoperable because of a failure in updating the software on a plurality of processors in a moving body control device.

An object of the present application is to improve safety in order to address the above issue. In addition, such an object further improves traffic safety, and contributes to development of a sustainable transportation system, accordingly.

According to a first aspect for achieving the above object, a moving body control device includes: a first processor; a first memory in which first software to be used by the first processor is stored; a second processor; a second memory in which second software to be used by the second processor is stored; a software update unit configured to perform update processing of the first software and the second software; a software abnormality recognition unit configured to recognize presence or absence of an abnormality in the first software stored in the first memory and the second software stored in the second memory, after the update processing is performed; and a software abnormality handling unit configured to cause either the first processor or the second processor to perform abnormality handling processing of operating a target moving body to be controlled by the moving body control device in a predetermined abnormality handling mode, in a case where the software abnormality recognition unit recognizes the abnormality of either the first software stored in the first memory or the second software stored in the second memory.

In the above moving body control device, in a case where a version of the first software that is valid and stored in the first memory is different from a version of the second software that is valid and stored in the second memory, or in a case where secure boot of either the first software that is valid and stored in the first memory or the second software that is valid and stored in the second memory results in a failure, the software abnormality recognition unit may recognize that either the first software stored in the first memory or the second software stored in the second memory is abnormal.

In the above moving body control device, an area for storing a new version of the first software that has been updated by the update processing and an area for storing an old version of the first software before being updated by the update processing may be set in the first memory, an area for storing a new version of the second software that has been updated by the update processing and an area for storing an old version of the second software before being updated by the update processing may be set in the second memory, and in a case where the software abnormality recognition unit recognizes that either the first software stored in the first memory or the second software stored in the second memory is abnormal because the version of the first software that is valid and stored in the first memory is different from the version of the second software that is valid and stored in the second memory, the software abnormality handling unit may cause the first processor to execute the old version of the first software stored in the first memory, and may also cause the second processor to execute the old version of the second software stored in the second memory, as the abnormality handling processing.

In the above moving body control device, in a case where the software abnormality recognition unit recognizes that the secure boot of the first software that is valid and stored in the first memory results in the failure and the secure boot of the first software that is valid and stored in the second memory results in a success, the software abnormality handling unit may perform processing of prohibiting the first processor from executing the first software and causing the second processor to execute the second software, as the abnormality handling processing.

In the above moving body control device, the software abnormality handling unit may cause a notification unit provided in the target moving body to notify that the abnormality handling processing is being performed.

In the above moving body control device, an area for storing a new version of the first software that has been updated by the update processing and an area for storing an old version of the first software before being updated by the update processing nay be set in the first memory, an area for storing a new version of the second software that has been updated by the update processing and an area for storing an old version of the second software before being updated by the update processing may be set in the second memory, and in a state in which the new version of the first software is stored in the first memory as the first software that is valid and the new version of the second software is stored in the second memory as the second software that is valid, and in a case where the software abnormality recognition unit recognizes that either the secure boot of the new version of the first software stored in the first memory or the new version of the second software stored in the second memory results in the failure, the software abnormality handling unit may cause the first processor to execute the old version of the first software stored in the first memory, and may also cause the second processor to execute the old version of the second software stored in the second memory, as the abnormality handling processing.

According to a second aspect for achieving the above object, a moving body control method to be performed by a moving body control device including: a first processor; a first memory in which first software to be used by the first processor is stored; a second processor; and a second memory in which second software to be used by the second processor is stored, and the moving body control method includes: a software update step of performing update processing of the first software and the second software; a software abnormality recognition step of recognizing presence or absence of an abnormality in the first software stored in the first memory and the second software stored in the second memory, after the update processing is performed; and a software abnormality handling step of causing either the first processor or the second processor to perform abnormality handling processing of operating a target moving body to be controlled by the moving body control device in a predetermined abnormality handling mode, in a case where the software abnormality recognition step recognizes the abnormality of either the first software stored in the first memory or the second software stored in the second memory.

According to a third aspect for achieving the above object, a non-transitory recording medium storing a program that causes a moving body control device including:

- a first processor; a first memory in which first software to be used by the first processor is stored; a second processor; and a second memory in which second software to be used by the second processor is stored, to function as: a software update unit configured to perform update processing of the first software and the second software; a software abnormality recognition unit configured to recognize presence or absence of an abnormality in the first software stored in the first memory and the second software stored in the second memory, after the update processing is performed; and a software abnormality handling unit configured to cause either the first processor or the second processor to perform abnormality handling processing of operating a target moving body to be controlled by the moving body control device in a predetermined abnormality handling mode, in a case where the software abnormality recognition unit recognizes the abnormality of either the first software stored in the first memory or the second software stored in the second memory.

According to the moving body control device, the moving body control method, and the recording medium, in a case where a software update in the moving body control device has not been normally completed, it is possible to suppress a situation in which the moving body becomes inoperable.

DETAILED DESCRIPTION

Figure 1:
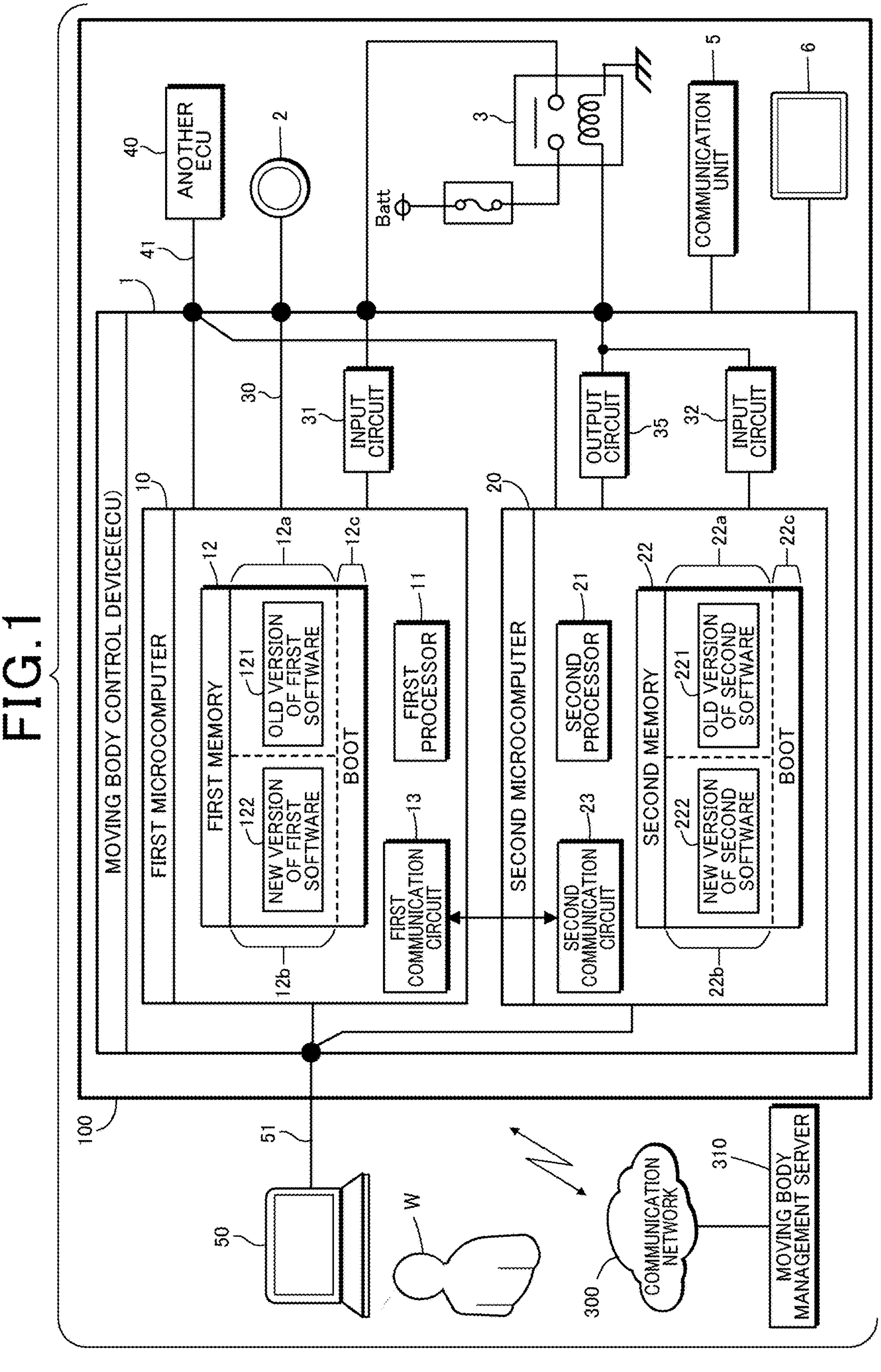
FIG. 1 is a configuration diagram of a moving body control device.

1. Configuration of Moving Body Control Device

A configuration of a moving body control device 1 in the present embodiment will be described with reference to FIG. 1. The moving body control device 1 is an electronic control unit (ECU) that controls the operation of a moving body 100 (corresponding to a target moving body in the present disclosure). The moving body 100 is a vehicle, an aircraft, a ship, or the like. The moving body 100 includes a communication unit 5, which performs wireless communication with a moving body management server 310 and the like through a communication network 300, and a display 6 (corresponding to a notification unit in the present disclosure). The communication unit 5 and the display 6 are in connection with the moving body control device 1.

The moving body control device 1 includes a first microcomputer 10 and a second microcomputer 20. The first microcomputer 10 includes a first processor 11, a first memory 12, a first communication circuit 13, and the like, and the second microcomputer 20 includes a second processor 21, a second memory 22, a second communication circuit 23, and the like. In the first memory 12, an old version of first software 121 and a new version of first software 122, which are to be executed by the first processor 11, are stored. The first memory 12 and the second memory 22 are each, for example, a code flash memory.

The old version of first software 121 and the new version of first software 122 are pieces of software to be used by the first processor 11, and each include a control program for the moving body 100, a data set used for controlling the moving body 100, and the like.

In the second memory 22, an old version of second software 221 and a new version of second software 222 are pieces of software to be used by the second processor 21, and each include a control program for the moving body 100, a data set used for controlling the moving body 100, and the like.

The old version of first software 121 is stored in an area 12*a* of the first memory 12, and the new version of first software 122 is stored in an area 12*b* of the first memory 12. A program of boot (bootstrap) processing of the first microcomputer 10 is stored in an area 12*c* of the first memory 12. In addition, the old version of second software 221 is stored in an area 22*a* of the second memory 22, and the new version of second software 222 is stored in an area 22*b* of the second memory 22. A program of boot processing of the second microcomputer 20 is stored in an area 22*c* of the second memory 22.

In this manner, the storage areas of the first software and the second software in the first memory 12 and the second memory 22 have a two-sided configuration, and both the old versions and the new versions of first software and the second software can be stored. Thus, as will be described later, when an update from the old version to the new version fails, the moving body 100 can be continuously operated by use of the old version of first software and the old version of second software.

The first microcomputer 10 is connected with a start/stop (SS) switch 2, which instructs switching between on (power on state) and off (power off state) of an ignition (IG) of the moving body 100, and an operation signal of the SS switch 2 is input into the first microcomputer 10 via an input circuit 30. An IG relay 3 is connected with the second microcomputer 20, and on and off of the IG relay 3 is controlled by a control signal output from the second microcomputer 20 via an output circuit 35 to switch on and off of the IG of the moving body 100.

An output portion of the output circuit 35 is connected with an input circuit 32, and a detection signal of an output state (on or off state of the IG relay 3) of the output circuit 35 is input into the second microcomputer 20 from the input circuit 32. An output portion of the IG relay 3 is connected with an input circuit 31, and a detection signal of on or off of the IG relay 3 is input into the first microcomputer 10 from the input circuit 31.

In addition, the moving body control device 1 is connected with another ECU 40, which is mounted on the moving body 100, through a communication line 41. Examples of communication specifications between the moving body control device 1 and another ECU 40 through the communication line 41 include, a controller area network (CAN, registered trademark), a CAN with flexible data rate (CAN FD), a local interconnect network (LIN), Ethernet (registered trademark), and FlexRay (registered trademark).

The moving body control device 1 is capable of connecting with a terminal device 50 through a connection cable 51, and a worker W is able to operate the terminal device 50 to update the first software from the old version to the new version and update the second software from the old version to the new version.

In addition, the moving body control device 1 causes the communication unit 5 to update the first software and the second software with use of over the air (OTA) on wireless communication with the moving body management server 310 through the communication network 300. That is, the moving body control device 1 downloads the new version of first software from the moving body management server 310, updates the first software, downloads the new version of second software from the moving body management server 310, and updates the second software.

2. Software Update Timing

Update timings of the first software and the second software will be described with reference to FIG. 2. The first software and the second software are updated by similar processing at the same timing. Here, the first software and the second software will be collectively referred to as software, the first microcomputer 10 and the second microcomputer 20 will be collectively referred to as a microcomputer, and the first memory 12 and the second memory 22 will be collectively referred to as a memory. The first software is updated by the first processor 11 executing the program of the boot processing stored in the area 12*c* of the first memory 12. The second software is updated by the second processor 21 executing the program of the boot processing stored in the area 22*c* of the second memory 22.

Figure 2:
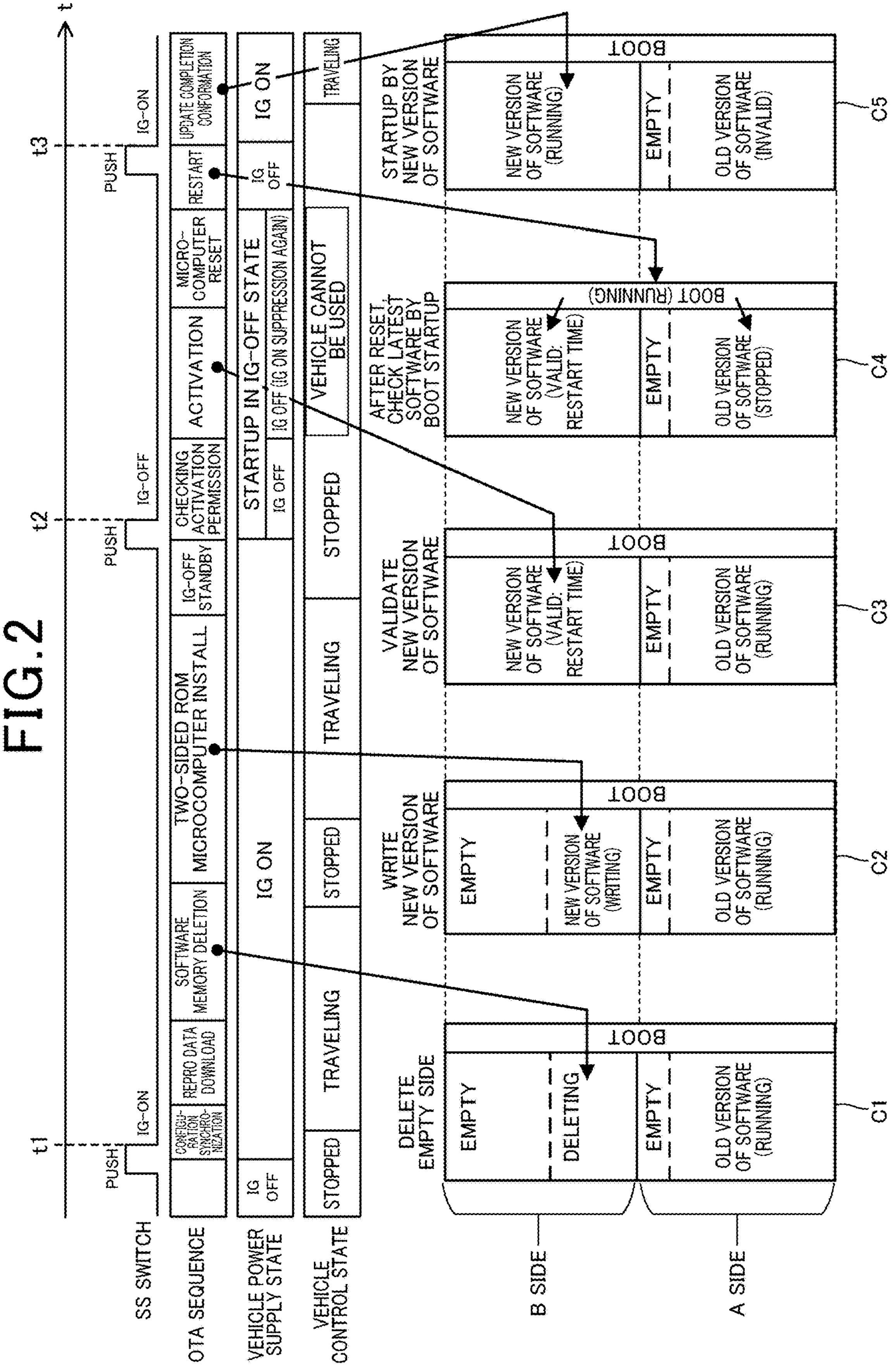
FIG. 2 is a timing chart of software update processing in the moving body control device.

FIG. 2 illustrates a sequence of software update processing with use of the OTA in a time-series manner along a time axis t. When recognizing an IG-ON operation on the SS switch 2 at t1, the moving body control device 1 starts an OTA sequence, establishes configuration synchronization, downloads repro data (data of software of a new version) from the moving body management server 310, and deletes software.

Note that FIG. 2 illustrates an example in which when recognizing the IG-ON operation on the SS switch 2, the moving body control device 1 updates the software with use of the OTA. However, the software may be updated at another timing. For example, when the moving body control device 1 receives an update instruction signal of the software transmitted from another ECU 40 through the communication line 41, a series of processing for updating the software may be performed with use of the OTA, that is, the startup and shutdown of the moving body control device 1 and switching of a program between the new version and the old version (including restart of the moving body control device 1) may be performed.

In FIG. 2, as indicated by C1 to C5, A side denotes an area of the memory in which the old version software before being updated is stored, and B side denotes an area of the memory in which the new version software after having been updated is stored. C1 indicates a situation in which the B side that stores the new version software is deleted, and a deleted area becomes an empty area sequentially. The old version software that is valid (running) is stored in the A side.

Subsequently, the microcomputer starts writing the new version software into the B side, and is on standby of IG-OFF after the writing is completed. C2 indicates a situation in which the new version software is written in the B side. At t2, when recognizing an IG-OFF operation on the SS switch 2, the microcomputer checks permission of activation (checks whether there is an error in the downloaded new version software, or the like). The, upon confirmation of the permission, the microcomputer activates the new version software, and resets itself. C3 indicates a situation in which writing of the new version software into the B side is completed. When the microcomputer is restarted next time, the new version software is valid.

At t3, when recognizing the IG-ON operation on the SS switch 2, the microcomputer confirms that the update from the old version to the new version of the software has been completed, and switches the software to be activated to the new version from the old version. C5 indicates a state in which the software to be activated by the microcomputer at the time of IG-ON is switched to the new version software stored in the B side from the old version software stored in the A side.

In the example illustrated in FIG. 2, IG-ON and IG-OFF is switched with the operation input into the SS switch 2 used as a trigger, without being limited to this. An input means used as the trigger can be replaced with another means.

For example, a door switch, a switch (physical switch or touch switch) of a display unit provided in the vehicle, a brake lever, an accelerator lever, or a mobile device (a smartphone, a terminal device for a vehicle, or the like) may be configured for the input means used as the trigger in order to control switching between IG-ON and IG-OFF.

Figure 3:
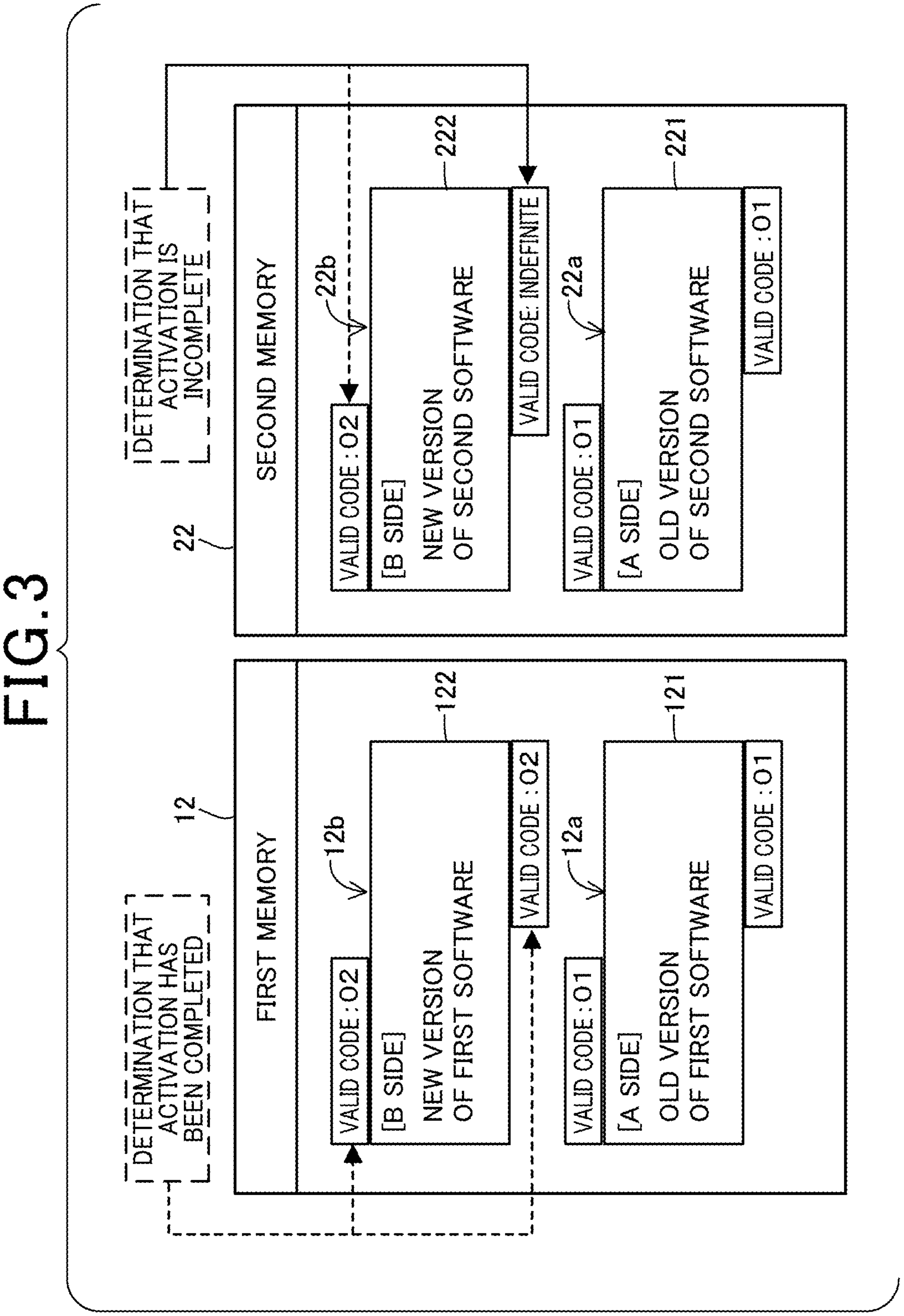
FIG. 3 is an explanatory diagram in a stored form of software in a memory.

Here, FIG. 3 illustrates a stored form of the old version of first software 121 and the new version of first software 122 in the first memory 12, and a stored form of the old version of second software 221 and the new version of second software 222 in the second memory 22. In the first memory 12, a valid code "01" is recorded in a header and a footer of the old version of first software 121, which is recorded in the A side. In addition, a valid code "02" is recorded in a header and a footer of the new version of first software 122, which is recorded in the B side.

The valid code is recorded by incrementing by one, whenever the software version is updated. In the footer, a valid code is recorded, when the activation of the software is completed. Therefore, it is possible to check whether the activation of the software is completed in accordance with the presence or absence of the valid code recorded in the footer. In the example of FIG. 3, for the first software, the valid codes are recorded in the footers of the old version of first software 121 and the new version of first software 122. Thus, it is possible to confirm that the activation of both of them is completed.

On the other hand, for the second software stored in the second memory 22, the valid code "01" is recorded in the header and the footer of the old version of second software 221, but the valid code is not recorded in the footer of the new version of second software 222 (indefinite). Therefore, it can be confirmed that the activation of the old version of second software 221 has been completed, but the activation of the new version of second software 222 has not been completed.

3. Software Abnormality Handling Processing

According to flowcharts illustrated in FIGS. 4 to 6, abnormality handling processing of the first software and the second software to be respectively performed by the first processor 11 of the first microcomputer 10 and the second processor 21 of the second microcomputer 20 will be described. The first processor 11 executes the program of the boot processing stored in the area 12*c* of the first memory 12, and the second processor 21 executes the program of the boot processing stored in the area 22*c* of the second memory 22, thereby each functioning as a software update unit, a software abnormality recognition unit, and a software abnormality handling unit in the present disclosure, and perform the processing of the flowcharts illustrated in FIGS. 4 to 6. The programs may be read from a recording medium (a magnetic disk, an optical disk, a flash memory, etc.) for retention in the first memory 12 and the second memory 22 or downloaded from an external server via a communication network 300 for retention in the first memory 12 and the second memory 22.

The processing performed by the software update unit corresponds to a software update step in a moving body control method in the present disclosure, and the processing performed by the software abnormality recognition unit corresponds to a software abnormality recognition step in the moving body control method in the present disclosure. The processing performed by the software abnormality handling unit corresponds to a software abnormality handling step in the moving body control method in the present disclosure.

Figure 4:
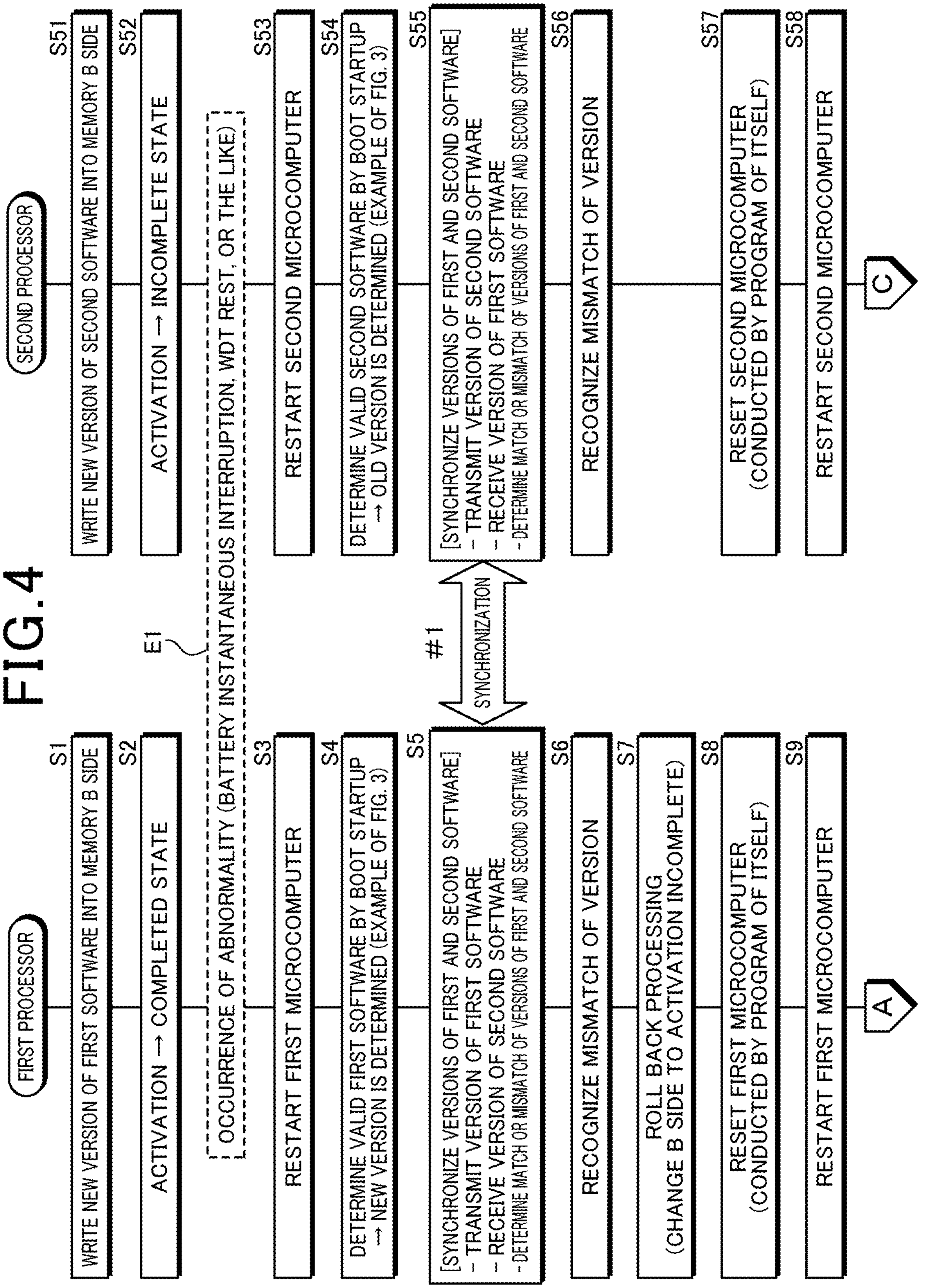
FIG. 4 is a first flowchart of software abnormality handling processing performed by a first microcomputer and a second microcomputer.
Figure 5:
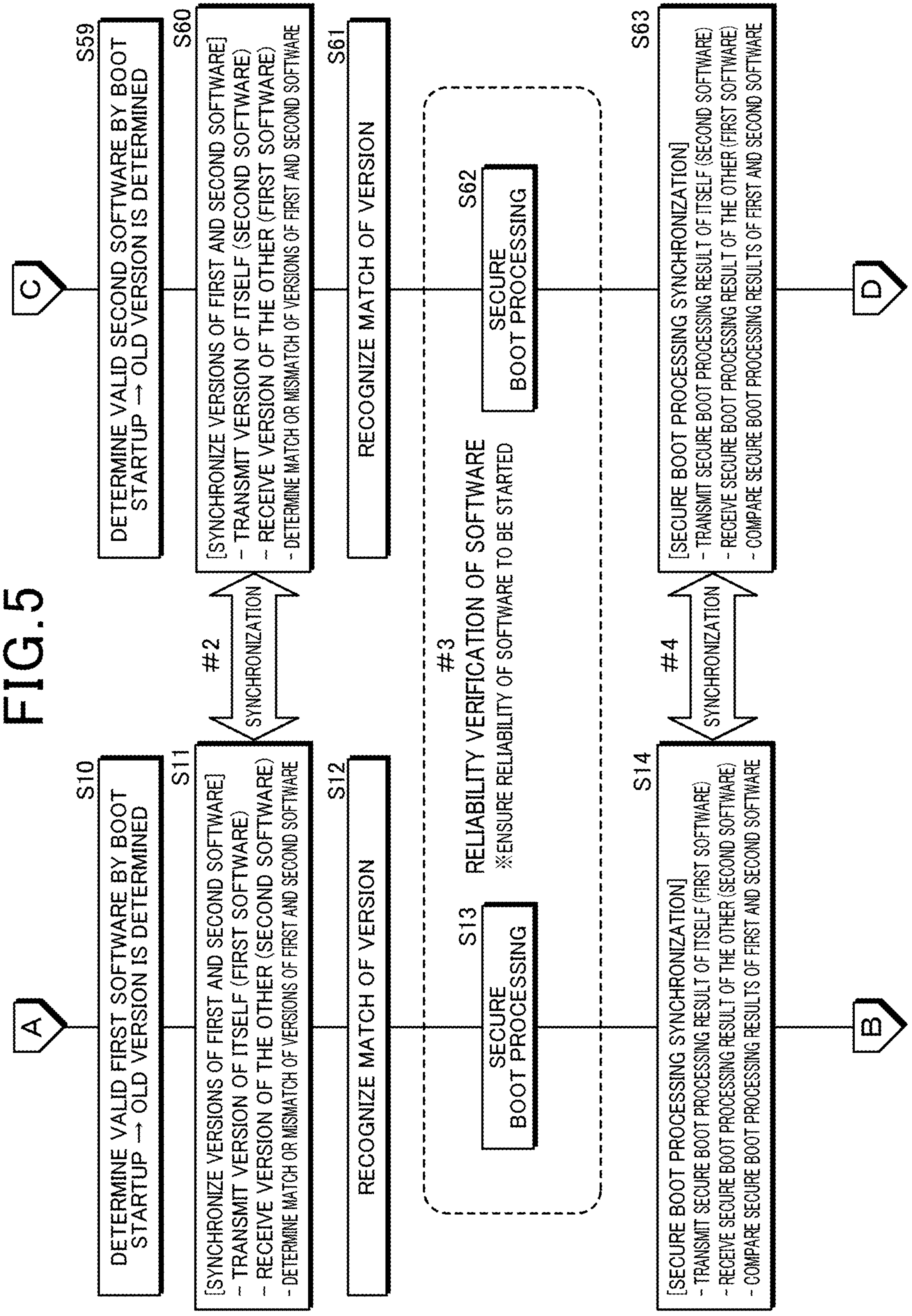
FIG. 5 is a second flowchart of the software abnormality handling processing performed by the first microcomputer and the second microcomputer.
Figure 6:
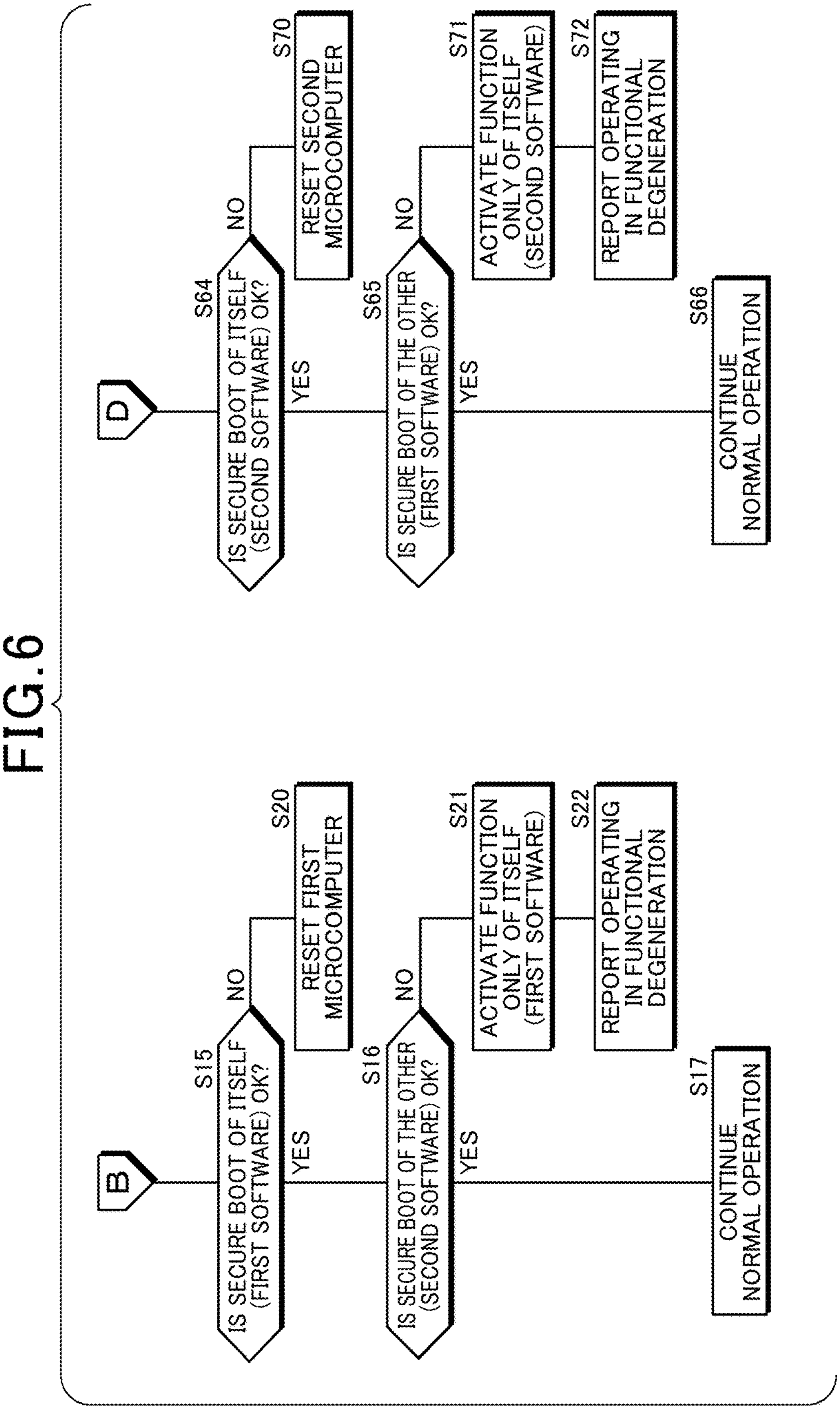
FIG. 6 is a third flowchart of the software abnormality handling processing performed by the first microcomputer and the second microcomputer.

As illustrated in FIG. 3, the processing according to the flowcharts of FIGS. 4 to 6 is abnormality handling processing for handling a case where the update of the first software from the old version to the new version in the first microcomputer 10 has been normally completed, but the update of the second software from the old version to the new version in the second microcomputer 20 has not been normally completed.

As described above with reference to FIG. 2, when the IG-ON of the SS switch 2 is recognized at t1 and the update timing of the first software and the second software with use of the OTA comes, the first processor 11 and the second processor 21 perform the processing in accordance with the flowcharts of FIGS. 4 to 6.

In the example illustrated in FIG. 2, IG-ON and IG-OFF is switched with the operation input into the SS switch 2 used as a trigger, without being limited to this. An input means used as the trigger can be replaced with another means.

For example, a door switch, a switch (physical switch or touch switch) of a display unit provided in the vehicle, a brake lever, an accelerator lever, or a mobile device (a smartphone, a terminal device for a vehicle, or the like) may be configured for the input means used as the trigger in order to control switching between IG-ON and IG-OFF.

The first processor 11 and the second processor 21 recognize IG-ON or IG-OFF from the state of the power supply of the moving body 100, and perform the processing in accordance with the flowcharts of FIGS. 4 to 6, when the software update timing of the first software and the second software with use of the OTA comes.

In step S1 of FIG. 4, the first processor 11 writes the new version of first software 122, which has been downloaded from the moving body management server 310, into the B side 12*b* of the first memory 12. In subsequent step S2, the first processor 11 activates the new version of first software 122, and completes the activation.

Similarly, in step S51, the second processor 21 writes the new version of second software 222, which has been downloaded from the moving body management server 310, into the B side 22*b* of the second memory 22. In subsequent step S52, the second processor 21 starts activation of the new version of second software 222, but an abnormality of E1 (instantaneous interruption of a battery, reset of a Watchdog Timer (WDT), or the like) is occurring, before the activation is completed. Therefore, the activation of the new version of second software 222 is in an incomplete state. The configuration for performing steps S1 and S2 and steps S51 and S52 corresponds to the software update unit in the present disclosure.

In step S3, the first processor 11 restarts the first microcomputer 10. In subsequent step S3, the first processor 11 determines that valid first software is the new version in accordance with boot startup (see FIG. 3). Similarly, the second processor 21 restarts the second microcomputer 20 in step S54. In subsequent step S54, the second microcomputer 20 determines that valid second software is the old version in accordance with boot startup (see FIG. 3).

In next steps S5 and S55, the first processor 11 and the second processor 21 mutually transmit and receive the valid versions of the first software and the second software. Then, the first processor 11 and the second processor 21 determine whether the valid versions of the first software and the second software match each other.

In subsequent step S6, the first processor 11 recognizes a mismatch between the valid versions of the first software and the second software. As illustrated in FIG. 3, the first software valid in the first microcomputer 10 is the new version. Therefore, the first processor 11 recognizes that the version of the second software valid in the second microcomputer 20 is the old version. The processing of performing steps S4 to S6 and steps S54 to S56 corresponds to the software abnormality recognition unit in the present disclosure.

The first processor 11, which recognizes the mismatch between the valid versions of the first software and the second software, performs roll back processing of making the activation incomplete for the new version of first software 122, which is stored in the B side 12*b*, in the next step S7. The configuration for performing the processing of step S7 corresponds to the software abnormality handling unit in the present disclosure.

Accordingly, as illustrated in FIG. 3, the valid code recorded in the footer of the new version of first software 122, which is stored in the B side 12*b* of the first memory 12, is changed from "02" to "indefinite". In subsequent step S8, the first processor 11 resets the first microcomputer 10, and the first microcomputer 10 is restarted in step S9.

On the other hand, in step S56, the second processor 21 recognizes that the valid versions of the first software and second software do not match each other. As illustrated in FIG. 3, here, the second software valid in the second microcomputer 20 is the old version. Therefore, the second processor 21 determines that the roll back processing is unnecessary. In subsequent step S21, the second processor 21 resets the second microcomputer 20, and the second microcomputer 20 is restarted in step S58.

In step S10 of FIG. 5, the first processor 11 determines valid first software in accordance with boot startup, and determines that the old version of first software 121 is valid. In addition, in step S59, the second processor 21 determines valid second software in accordance with boot startup, and determines that the old version of second software 221 is valid.

In the next steps S11 and S60, the first processor 11 and the second processor 21 mutually transmit and receive the valid versions of the first software and the second software. Then, the first processor 11 and the second processor 21 determine whether the valid versions of the first software and the second software match each other.

In subsequent step S12, the first processor 11 recognizes that the valid versions of the first software and second software match each other. In addition, in step S61, the second processor 21 recognizes that the valid versions of the first software and second software match each other. In next step S13, the first processor 11 performs secure boot processing of the old version of first software 121 to verify reliability (presence or absence of tampering or the like) of the old version of first software 121.

In addition, in step S62, the second processor 21 performs secure boot processing of the old version of second software 221, and detects the reliability of the old version of second software 221. In subsequent steps S14 and S63, the first processor 11 and the second processor 21 mutually transmit and receive results of the secure boot processing, and compare the results of the secure boot processing between the old version of first software 121 and the old version of second software 221. The configuration for performing the processing in steps S10 to S14 and steps S59 to S63 in FIG. 5 corresponds to the software abnormality handling unit in the present disclosure.

Subsequently, in step S15 in FIG. 6, the first processor 11 determines whether the result of the secure boot of itself (the old version of first software 121) is OK (absence of abnormality). Then, the first processor 11 advances the processing to step S16, in a case where the result of the secure boot is OK, and advances the processing to step S20, in a case where the result of the secure boot is NG (presence of abnormality).

In step S20, the first processor 11 resets the first microcomputer 10, and performs the processing of the secure boot processing in step S13 and later in FIG. 5 again. The first processor 11 retries the processing of the secure boot processing in S13 and later in FIG. 5 a predetermined number of times, until the result of the secure boot processing is OK.

In step S16, the first processor 11 determines whether the result of the secure boot of the other (the old version of second software 221) is OK. Then, in a case where the result of the secure boot of the other is OK, the first processor 11 advances the processing to step S17, and continuously controls the normal operation of the moving body 100 in accordance with the old version of first software 121.

On the other hand, in a case where the result of the secure boot of the other is NG, the first processor 11 advances the processing to step S21, executes the old version of first software 121, and activates only the function of the moving body 100 that has been assigned to itself (the first microcomputer 10) (functional degeneration). In subsequent step S22, the first processor 11 notifies that the moving body 100 is operating in functional degeneration by displaying such a fact on the display 6.

Here, examples of the functions of the moving body 100 that are assigned to the first microcomputer 10 include wiper, headlight, security alarm, door lock, and partial diagnosis. In addition, the normal operations of the first microcomputer 10 include update (reprogramming) of the first software with use of a cable or the OTA, diagnosis (cancellation of security of diagnosis line or the like), and the like, in addition to the above functions.

Similarly, in step S64, the second processor 21 determines whether the result of the secure boot of itself (the old version of second software 221) is OK. Then, in a case where the result of the secure boot is OK, the second processor 21 advances the processing to step S65, and in a case where the result of the secure boot is NG, the second processor 21 advances the processing to step S70.

In step S70, the second processor 21 resets the second microcomputer 20, and performs the processing of the secure boot processing in step S62 and later in FIG. 5 again. The second processor 21 retries the processing of step S62 and later in FIG. 5 a predetermined number of times, until the result of the secure boot processing becomes OK.

In step S65, the second processor 21 determines whether the result of the secure boot of the other (the old version of first software 121) is OK. Then, in a case where the result of the secure boot of the other is OK, the second processor 21 advances the processing to step S66, and continuously controls the normal operation of the moving body 100 in accordance with the old version of second software 221.

In a case where the update of the second software fails in the processing of steps S17 and S66, the moving body 100 can be continuously operated with use of the old version of first software and the old version of second software. The mode of operating the moving body 100 with use of the old version of first software 121 and the old version of second software 221 in steps S17 and S66 corresponds to an abnormality handling mode in the present disclosure.

On the other hand, in a case where the result of the secure boot of the other is NG, the second processor 21 advances the processing to step S71, executes the old version of second software 221, and activates only the function of the moving body 100 that has been assigned to itself (the second microcomputer 20) (functional degeneration). In subsequent step S72, the second processor 21 notifies that the moving body 100 is operating in functional degeneration by displaying such a fact on the display 6.

In a case where the result of the secure boot is NG for the old version of first software or the old version of second software in the processing of steps S21 and S71, the moving body 100 can be continuously operated in functional degeneration. The configuration for performing the processing in steps S21 and S22 and steps S71 and S72 in FIG. 6 corresponds to the software abnormality handling unit in the present disclosure. The mode of operating the moving body 100 in functional degeneration using the old version of first software 121 or the old version of second software 221 in steps S21 and S71 corresponds to the abnormality handling mode in the present disclosure.

Note that in the flowcharts of FIGS. 4 to 6, processing corresponding to a case where the update of the second software has not been normally completed is described, as illustrated in FIG. 3. However, in a case where the update of the first software has not been normally completed, the second processor 21 may perform the roll back processing similar to step S7 of FIG. 5 for the second software. Then, the operation of the moving body 100 is controlled with use of the old versions of the first software and the second software.

4. Other Embodiments

In the above embodiment, in a case where the update of one of the first software and the second software has not been normally completed, the roll back processing in step S7 of FIG. 4 and the functional degeneration processing in steps S21 and S71 of FIG. 6 are performed. However, either one of the rollback processing or the functional degeneration processing may be performed. In a case where the roll back processing is not performed, it is determined whether the valid first software and the valid second software match each other in the secure boot processing in steps S13 and S62 in FIG. 5. In a case where they do not match each other, functional degeneration processing of operating the moving body 100 is configured by performing only either one of the first software or the second software. In a case where the roll back processing is not performed, it is not necessary to form the two-sided configuration, as illustrated in FIGS. 1 to 3, for the first memory 12 and the second memory 22.

In the above embodiment, in a case where the result of the secure boot of the first software or the second software is NG, the functional degeneration processing is performed in steps S22 and S72 of FIG. 6. However, the roll back processing is performed similarly to step S7 in FIG. 4, and the moving body 100 may be configured to be operated with use of the old versions of the first software and the second software.

In the above embodiment, in steps S22 and S72 of FIG. 6, the fact that the moving body 100 is operated in the functional degeneration is notified by being displayed on the display 6. As another embodiment, instead of the notification on the display 6 or in addition to the notification on the display 6, a notification may be given by sound to be output from a speaker provided in the moving body 100. Alternatively, the notification that the moving body 100 is operating in functional degeneration may be omitted.

Note that in order to facilitate understanding of the present invention, FIG. 1 is a schematic diagram illustrating the configuration of the moving body control device 1 to be segmented in accordance with main processing contents, and the moving body control device 1 may be configured in accordance with any other segment. In addition, the processing of each of the constitutional elements may be performed by a single hardware unit, or may be performed by a plurality of hardware units. Further, the processing of each constituent element illustrated in FIGS. 4 to 6 may be performed by one program, or may be performed by a plurality of programs.

5. Configurations Supported by Above-Described Embodiments

The above embodiments are specific examples of the following configurations.

Configuration 1: A moving body control device includes: a first processor; a first memory in which first software to be used by the first processor is stored; a second processor; a second memory in which second software to be used by the second processor is stored; a software update unit configured to perform update processing of the first software and the second software; a software abnormality recognition unit configured to recognize presence or absence of an abnormality in the first software stored in the first memory and the second software stored in the second memory, after the update processing is performed; and a software abnormality handling unit configured to cause either the first processor or the second processor to perform abnormality handling processing of operating a target moving body to be controlled by the moving body control device in a predetermined abnormality handling mode, in a case where the software abnormality recognition unit recognizes the abnormality of either the first software stored in the first memory or the second software stored in the second memory.

According to the moving body control device in the configuration 1, in the case where the update of either the first software or the second software has not been normally completed, it is possible to suppress a situation in which the target moving body becomes inoperable.

Configuration 2: The moving body control device described in the configuration 1, in which in a case where a version of the first software that is valid and stored in the first memory is different from a version of the second software that is valid and stored in the second memory, or in a case where secure boot of either the first software that is valid and stored in the first memory or the second software that is valid and stored in the second memory results in a failure, the software abnormality recognition unit recognizes that either the first software stored in the first memory or the second software stored in the second memory is abnormal.

According to the moving body control device in the configuration 2, in a case where the update processing of either the first software or the second software has not been normally completed, and thus the valid versions of the first software and the second software are different from each other, it is possible to recognize that either the first software or the second software is abnormal. In addition, in a case where the secure boot of the valid first software or the valid second software results in a failure, it is possible to recognize that either the first software or the second software is abnormal.

Configuration 3: The moving body control device described in the configuration 2, an area for storing a new version of the first software that has been updated by the update processing and an area for storing an old version of the first software before being updated by the update processing are set in the first memory, an area for storing a new version of the second software that has been updated by the update processing and an area for storing an old version of the second software before being updated by the update processing are set in the second memory, and in a case where the software abnormality recognition unit recognizes that either the first software stored in the first memory or the second software stored in the second memory is abnormal because the version of the first software that is valid and stored in the first memory is different from the version of the second software that is valid and stored in the second memory, the software abnormality handling unit causes the first processor to execute the old version of the first software stored in the first memory, and also causes the second processor to execute the old version of the second software stored in the second memory, as the abnormality handling processing.

According to the moving body control device in the configuration 3, in a case where the valid versions of the first software and the second software are different from each other because update of the first software or the second software to the new version has not been normally completed, it is possible to cause the first processor and the second processor to respectively execute the old version of first software and the old version of second software to operate the target moving body.

Configuration 4: The moving body control device described in the configuration 2 or 3, in which in a case where the software abnormality recognition unit recognizes that the secure boot of the first software that is valid and stored in the first memory results in the failure and the secure boot of the first software that is valid and stored in the second memory results in a success, the software abnormality handling unit performs processing of prohibiting the first processor from executing the first software and causing the second processor to execute the second software, as the abnormality handling processing.

According to the moving body control device in the configuration 4, in a case where a failure of the first software is recognized, the operation of the target moving body can be ensured by causing the second processor to execute the second software in which the failure is not recognized.

Configuration 5: The moving body control device described in the configuration 4, in which the software abnormality handling unit causes a notification unit provided in the target moving body to notify that the abnormality handling processing is being performed.

According to the moving body control device in the configuration 5, for example, it is possible to notify the user riding in the target moving body that the operation of the target moving body is limited, because the first software is not executed.

Configuration 6: The moving body control device described in the configuration 2 or 3, in which an area for storing a new version of the first software that has been updated by the update processing and an area for storing an old version of the first software before being updated by the update processing are set in the first memory, an area for storing a new version of the second software that has been updated by the update processing and an area for storing an old version of the second software before being updated by the update processing are set in the second memory, and in a state in which the new version of the first software is stored in the first memory as the first software that is valid and the new version of the second software is stored in the second memory as the second software that is valid, and in a case where the software abnormality recognition unit recognizes that either the secure boot of the new version of the first software stored in the first memory or the new version of the second software stored in the second memory results in the failure, the software abnormality handling unit causes the first processor to execute the old version of the first software stored in the first memory, and also causes the second processor to execute the old version of the second software stored in the second memory, as the abnormality handling processing.

According to the moving body control device in the configuration 6, after update of either the first software or the second software to the new version is completed, in a case where the secure boot of either the valid first software or the valid second software results in a failure, the first processor and the second processor are caused to respectively execute the old versions of the first software and the second software, so that the target moving body can be operated.

Configuration 7: A moving body control method to be performed by a moving body control device including: a first processor; a first memory in which first software to be used by the first processor is stored; a second processor; and a second memory in which second software to be used by the second processor is stored, and the moving body control method includes: a software update step of performing update processing of the first software and the second software; a software abnormality recognition step of recognizing presence or absence of an abnormality in the first software stored in the first memory and the second software stored in the second memory, after the update processing is performed; and a software abnormality handling step of causing either the first processor or the second processor to perform abnormality handling processing of operating a target moving body to be controlled by the moving body control device in a predetermined abnormality handling mode, in a case where the software abnormality recognition step recognizes the abnormality of either the first software stored in the first memory or the second software stored in the second memory.

By causing the moving body control device to perform the moving body control method in the configuration 7, an operational configuration similar to that of the moving body control device in the configuration 1 is obtainable.

Configuration 8: A non-transitory recording medium storing a program that causes a moving body control device including: a first processor; a first memory in which first software to be used by the first processor is stored; a second processor; and a second memory in which second software to be used by the second processor is stored, to function as: a software update unit configured to perform update processing of the first software and the second software; a software abnormality recognition unit configured to recognize presence or absence of an abnormality in the first software stored in the first memory and the second software stored in the second memory, after the update processing is performed; and a software abnormality handling unit configured to cause either the first processor or the second processor to perform abnormality handling processing of operating a target moving body to be controlled by the moving body control device in a predetermined abnormality handling mode, in a case where the software abnormality recognition unit recognizes the abnormality of either the first software stored in the first memory or the second software stored in the second memory.

By causing the moving body control device to execute the program in the configuration 8, the configuration of the moving body control device in the configuration 1 is achievable.

REFERENCE SIGNS LIST

1 Moving body control device
2 SS switch
3 IG relay
5 Communication unit
6 Display (notification unit)
10 First microcomputer
11 First processor
12 First memory

13 First communication circuit
20 Second microcomputer
21 Second processor
22 Second memory
23 Second communication circuit
30, 32, 33 Input circuit
35 Output circuit
50 Terminal device
100 Moving body
121 Old Version of first software
122 New version of first software
221 Old Version of second software
222 New version of second software
300 Communication network
310 Moving body management server
W Worker

What is claimed is:

1. A moving body control device comprising:
a first processor:
a first memory in which first software to be used by the first processor is stored;
a second processor; and
a second memory in which second software to be used by the second processor is stored, wherein
the first processor and the second processor are configured to:
perform update processing of the first software and the second software, respectively; and
recognize presence or absence of an abnormality in the first software stored in the first memory and the second software stored in the second memory, after the update processing is performed, respectively,
the moving body control device is configured that that by either the first processor or the second processor, abnormality handling processing of operating a target moving body to be controlled by the moving body control device is performed in a predetermined abnormality handling mode, in a case where the abnormality of either the first software stored in the first memory or the second software stored in the second memory is recognized, and
in a case where a version of the first software that is valid and stored in the first memory is different from a version of the second software that is valid and stored in the second memory, or in a case where secure boot of either the first software that is valid and stored in the first memory or the second software that is valid and stored in the second memory results in a failure, the first processor and the second processor are configured to recognize that either the first software stored in the first memory or the second software stored in the second memory is abnormal.

2. The moving body control device according to claim 1, wherein
an area for storing a new version of the first software that has been updated by the update processing and an area for storing an old version of the first software before being updated by the update processing are set in the first memory,
an area for storing a new version of the second software that has been updated by the update processing and an area for storing an old version of the second software before being updated by the update processing are set in the second memory, and
in a case where either the first software stored in the first memory or the second software stored in the second memory is abnormal because the version of the first software that is valid and stored in the first memory is different from the version of the second software that is valid and stored in the second memory is recognized, the moving body control device is configured such that, by the first processor, the old version of the first software stored in the first memory is executed, and also, by the second processor, the old version of the second software stored in the second memory is executed, as the abnormality handling processing.

3. The moving body control device according to claim 1, wherein
in a case where the secure boot of the first software that is valid and stored in the first memory results in the failure and the secure boot of the first software that is valid and stored in the second memory results in a success is recognized, the moving body control device is configured such that processing of prohibiting the first processor from executing the first software is performed and, by the second processor, the second software is executed, as the abnormality handling processing.

4. The moving body control device according to claim 3, wherein
either the first processor or the second processor causes a notification unit provided in the target moving body to notify that the abnormality handling processing is being performed.

5. The moving body control device according to claim 1, wherein
an area for storing a new version of the first software that has been updated by the update processing and an area for storing an old version of the first software before being updated by the update processing are set in the first memory,
an area for storing a new version of the second software that has been updated by the update processing and an area for storing an old version of the second software before being updated by the update processing are set in the second memory, and
in a state in which the new version of the first software is stored in the first memory as the first software that is valid and the new version of the second software is stored in the second memory as the second software that is valid, and in a case where either the secure boot of the new version of the first software stored in the first memory or the new version of the second software stored in the second memory results in the failure is recognized, the moving body control device is configured such that, by the first processor, the old version of the first software stored in the first memory is executed, and also, by the second processor, the old version of the second software stored in the second memory is executed, as the abnormality handling processing.

6. A moving body control method to be performed by a moving body control device including:
a first processor;
a first memory in which first software to be used by the first processor is stored;
a second processor; and
a second memory in which second software to be used by the second processor is stored,
the moving body control method comprising:
a software update step of performing update processing of the first software and the second software;
a software abnormality recognition step of recognizing presence or absence of an abnormality in the first software stored in the first memory and the second software stored in the second memory, after the update processing is performed; and a software abnormality handling step of causing either the first processor or the second processor to perform abnormality handling processing of operating a target moving body to be controlled by the moving body control device in a predetermined abnormality handling mode, in a case where the software abnormality recognition step recognizes the abnormality of either the first software stored in the first memory or the second software stored in the second memory, wherein in a case where a version of the first software that is valid and stored in the first memory is different from a version of the second software that is valid and stored in the second memory, or in a case where secure boot of either the first software that is valid and stored in the first memory or the second software that is valid and stored in the second memory results in a failure, the software abnormality recognition step recognizes that either the first software stored in the first memory or the second software stored in the second memory is abnormal.

7. A non-transitory recording medium storing a program that causes a moving body control device including:

a first processor;

a first memory in which first software to be used by the first processor is stored;

a second processor; and a second memory in which second software to be used by the second processor is stored, to function as:

a software update unit configured to perform update processing of the first software and the second software;

a software abnormality recognition unit configured to recognize presence or absence of an abnormality in the first software stored in the first memory and the second software stored in the second memory, after the update processing is performed; and a software abnormality handling unit configured to cause either the first processor or the second processor to perform abnormality handling processing of operating a target moving body to be controlled by the moving body control device in a predetermined abnormality handling mode, in a case where the software abnormality recognition unit recognizes the abnormality of either the first software stored in the first memory or the second software stored in the second memory, wherein in a case where a version of the first software that is valid and stored in the first memory is different from a version of the second software that is valid and stored in the second memory, or in a case where secure boot of either the first software that is valid and stored in the first memory or the second software that is valid and stored in the second memory results in a failure, the software abnormality recognition unit recognizes that either the first software stored in the first memory or the second software stored in the second memory is abnormal.

* * * * *